United States Patent Office 3,278,575
Patented Oct. 11, 1966

3,278,575
METHOD FOR THE MANUFACTURE OF ALIPHATIC NITRILES
Darwin Darrell Davis, Orange, Tex., and Leon Singrey Scott, Wilmington, Del., assignors to E. I. du Pont de Nemours and Company, Wilmington, Del., a corporation of Delaware
No Drawing. Filed Oct. 23, 1963, Ser. No. 318,193
5 Claims. (Cl. 260—465.3)

This invention relates to a process for the manufacture of aliphatic nitriles by the addition of hydrogen cyanide to olefins.

Teter, U.S. Patent 2,385,741 issued September 25, 1945, has described the addition of hydrogen cyanide to aliphatic olefins using a finely divided metallic cobalt catalyst. The olefin was heated to a temperature of 400° to 750° C. or higher with the catalyst and an excess of hydrocyanic acid at a pressure of about 1000–2000 p.s.i. for ten hours. The highest yield of organic nitrogen compound obtaind was about 3½% based on the olefin, substantially all of the olefin being consumed to form polymerization products (42%), cracked products (18.6%) and hydrogenated products (8%). A complete analysis of the organic nitrogen compounds was not given, but was evidently a mixture which included aromatic and cyclic compounds.

It has now been discovered that finely divided metallic nickel may be employed to catalyse the addition of hydrogen cyanide to lower aliphatic olefins to give extremely high yields of the adduct nitrile in a high degree of purity at contact times suitable for a continuous process and at moderate temperatures and pressures.

Accordingly, in its broadest aspect this invention comprises a method for the production of aliphatic nitriles by passing an aliphatic olefin mixed with hydrogen cyanide over a catalyst comprising finely divided nickel at a temperature in the range between about 300° C. and 400° C. and thereafter recovering an aliphatic nitrile formed by the addition of hydrogen cyanide to the olefin.

The catalyst is extremely active, and when a high concentration of hydrogen cyanide (e.g., the stoichiometric quantity required for the addition) is present it is difficult to control the temperature of the reaction bed. Accordingly, it has been found desirable to employ a substantial excess of olefin, preferably from 5 to 30 volumes of olefin per volume of hydrogen cyanide, and to recycle the olefin remaining after reaction has taken place and the nitrile has been removed by condensation. Alternatively, a large volume of a diluent gas inert under the reaction conditions to the reactants and the products may be employed. Small quantities of ammonia are formed by the reaction and tend to be recycled together with the olefin. The ammonia does not have a harmful effect on the reaction, but forms ammonium cyanide, with the hydrogen cyanide in the feed which tends to clog inlet lines. Accordingly, it is preferred to remove the ammonia in the recycle olefin by passing the vapor over an absorbant such as soda lime.

The catalyst employed in this invention is finely divided metallic nickel, preferably supported on a porous supporting material such as on gamma alumina, carbon, asbestos fiber or the like. The catalyst may be made by reduction of nickel oxide which is obtained by the addition of the stoichiometric quantity of a soluble alkali metal hydroxide to a water soluble nickel salt impregnated in the support material, and thereafter washing the impregnated support granules with water and drying. The support impregnated with the nickel oxide may then be reduced with hydrogen at a temperature in the range of about 300° C. to 550° C. for a period of ten hours or more to produce the active catalyst.

The average life of the catalyst is about 12 hours, over which period the average activity is about 70% of the initial activity of freshly prepared catalyst. The catalyst may thereafter be regenerated by calcining with an oxygen containing gas, preferably a mixture of water vapor and air, at a temperature in the range from about 500° C. to 800° C., and thereafter reducing the nickel oxide to nickel as described hereinabove for the production of fresh catalyst.

The temperature at which the reaction is preferred is suitably from 300° C. to 400° C. Temperatures less than 300° C. may be employed but require longer contact time than those required in the preferred range. Above about 350° C. the side products of the reaction tend to increase although the impurities thus produced are minor in quantity up to about 400° C.

The reaction may conveniently be conducted at atmospheric pressure, but higher and lower pressures may also be employed.

This invention is further illustrated by the following specific examples which should not, however, be construed as fully delineating the scope of this discovery.

*Example 1*

Ethylene was metered through a wet test meter and a rotameter in series and thence into a saturator containing liquid hydrogen cyanide at controlled temperature. The feed gas was then mixed with recycle ethylene and fed to the catalytic reactor which consisted of a 1" outside diameter hard glass tube fitted with a ¼" outside diameter thermowell down its center. The tube was filled with catalyst and heated to a controlled temperature with a thermostatically controlled muffle furnace. An electrical tape preheater was wrapped around the tube at the entrance to the furnace. The exit gases from the furnace was fed to a 250 ml. glass receiver fitted with a reflux condenser which was filled with ice. The exit gases from the condenser were then passed through a cold trap cooled with methanol and Dry Ice to remove the remaining condensable gases. The effluent from the cold trap was conducted to a glass T where most of the gases were recycled by a seal-less pump through a tube of soda lime to the feed gas. The remainder of the gas was purged through a gas chromatography sampling valve and thence through a tube containing "Ascarite" (a commercial sodium hydroxide on asbestos absorbent) to a wet test meter through which the residual gas was vented.

Using a 10/1 ethylene-recycle to an initial feed of equimolar proportions of hydrogen cyanide and ethylene the average conversion of hydrogen cyanide to propionitrile was found to be 95.4% using a temperature of 370° C. and a contact time of about 0.5 second.

The weight of catalyst employed was 101 grams consisting of nickel oxide, 10% by weight on ⅛" cylinders of gamma alumina reduced with hydrogen at 450° C. The yield based on ethylene was found to be at least 95% but could not be measured with great precision. The major impurities in the product, as determined by gas chromatography were acrylonitrile, 0.3% by weight, and acetonitrile 0.1% by weight.

*Example 2*

Using the apparatus described in Example 1, a mixture of butadiene and hydrogen cyanide together with about 20 volumes of nitrogen was passed over a reduced nickel catalyst at a temperature of about 350° C. About 100 grams of product consisting essentially of various isomers of cyanobutene together with about ½% of adiponitrile was obtained.

Nitriles are well known organic chemicals having a wide variety of uses as solvents and the like. They are important intermediates for the preparation of a broad spectrum of organic chemicals as described in the text "The Chemistry of Organic Compounds" by V. Migridichian, American Chemical Society Monograph No. 105, Reinhold Publishing Co., 1947.

Many other modifications of this invention will be apparent to those skilled in the art.

We claim:

1. A process for the manufacture of aliphatic nitriles which comprises passing a mixture of a lower aliphatic olefin and hydrogen cyanide over a catalyst consisting essentially of finely divided metallic nickel at a temperature in the range between 300° C. and 400° C. and thereafter recovering an aliphatic nitrile which is the adduct of hydrogen cyanide and the said olefin from the reaction product.

2. Process of claim 1 in which the said lower aliphatic olefin is ethylene.

3. Process of claim 1 in which the molar ratio of said olefin and hydrogen cyanide in the said mixture is from about 5 to about 30.

4. Process of claim 3 in which the said olefin is ethylene.

5. Process of claim 4 in which the said catalyst consists of finely divided metallic nickel supported on gamma alumina.

References Cited by the Examiner

UNITED STATES PATENTS 2,571,099   10/1951   Arthur et al. _____ 260—465.3

CHARLES B. PARKER, *Primary Examiner.*

JOSEPH P. BRUST, *Examiner.*